United States Patent [19]

Cain et al.

[11] Patent Number: 5,043,001
[45] Date of Patent: Aug. 27, 1991

[54] METHOD AND APPARATUS FOR FIBER COOLING

[75] Inventors: Michael B. Cain, Corning; William J. Kiefer, Horseheads; Jackson P. Trentelman, Painted Post; David J. Ulrich, Burdett, all of N.Y.

[73] Assignee: Corning Incorporated, Corning, N.Y.

[21] Appl. No.: 529,627

[22] Filed: May 29, 1990

[51] Int. Cl.⁵ .................................. C03B 37/023
[52] U.S. Cl. ............................... 65/2; 65/3.11; 65/12; 65/13; 118/405
[58] Field of Search ............... 65/1, 2, 11.1, 12, 3.11, 65/13, 3.1, 3.3, 3.43, 3.44; 118/405

[56] References Cited

U.S. PATENT DOCUMENTS

| | | | |
|---|---|---|---|
| 3,620,805 | 11/1971 | Martin | 118/405 |
| 3,977,854 | 8/1976 | Fulmer et al. | 65/3.1 |
| 4,208,200 | 6/1980 | Claypoole et al. | 65/11.1 |
| 4,396,409 | 8/1983 | Bailey et al. | 65/3.11 |
| 4,583,485 | 4/1986 | Smith | 118/405 X |
| 4,594,088 | 6/1986 | Paek et al. | 65/2 X |

Primary Examiner—Robert L. Lindsay
Attorney, Agent, or Firm—William J. Simmons

[57] ABSTRACT

A liquid cooling method and apparatus for rapid cooling of a hot glass fiber. In FIG. 1, an open ended liquid coolant container (12) is provided at its lower end with an inverted funnel surface (34). A vertically running, hot glass fiber (42) of indefinite length is continuously drawn through the container, as the container continuously receives a coolant liquid at its upper open end (30). The liquid continuously drains from the container lower open end (32) by flowing along flow surface (36) of the inverted funnel (34), downwardly and away from the glass fiber (42). The temperature of the fiber relative to the temperature of the coolant liquid is such that a vapor barrier surrounding the hot fiber is formed due to boiling of the liquid in a zone surrounding the fiber. This vapor zone facilitates diversion of the liquid (change in direction of flow) from the vertical to an angle thereto, along the inverted funnel surface. The substantially cooled hot glass fiber passes out of the container lower end for further processing, such as coating the fiber. The method and apparatus yields cooled glass fiber not wetted by the coolant liquid.

12 Claims, 3 Drawing Sheets

METHOD AND APPARATUS FOR FIBER COOLING

BACKGROUND OF THE INVENTION

This invention relates to a method and apparatus for cooling a hot glass fiber or filament as it is drawn from a molten glass preform in a furnace. A glass fiber is often employed as an optical waveguide, synonymously, an optical fiber. A glass preform is drawn to a fiber or filament and then coated with a protective material to maintain its strength, as known in the art.

Prior to coating the glass fiber it is necessary that it be quenched in order to realize production at relatively high rates as opposed to permitting it to cool by mere exposure to ambient temperature.

The art is aware of methods and apparatus for rapid cooling of hot glass fibers, such is shown in U.S. Pat. Nos. 4,594,088 issued to Paek et al, 4,208,200 issued to Claypoole et al, and Japanese Patent Application publication 63-159,239. Prior art methods of rapid cooling of hot glass fibers which are intended to be used as optical fibers, have included, typically, a liquid coolant bath through which the fiber is continuously vertically drawn with the liquid bath serving to quench the fiber and thus reduce the its temperature. Subsequent to passing from such liquid cooling devices, the fiber may be further treated by passing it through a gas, so as to thereby evaporate any liquid from the liquid bath which might remain upon the fiber.

Such prior art techniques and apparatus have not met with complete commercial success, however, because of the somewhat complex nature of the apparatus.

SUMMARY OF THE INVENTION

According to this invention, a method and apparatus is disclosed which permits the use of liquid coolant for rapidly cooling a hot glass fiber or filament prior to subsequent treatment, such as providing the fiber with a protective coating. The apparatus includes a container for supporting a cylindrical annulus of liquid coolant, the container having an opening at both its upper and its lower ends. The lower opening of the container communicates with a flow surface which slants downwardly and laterally away from the vertically running glass fiber. A coolant liquid is continuously supplied to the container. The liquid continuously flows from the lower or exit opening of the container and onto the flow surface due to surface tension, the liquid wetting the surface. The lower end of the flow surface is arranged to direct the liquid toward a means for collecting it. By virtue of this arrangement, the hot glass fiber enters the container at the upper opening, passes vertically therethrough and exits from the lower opening, without the requirement of a wiping seal or the like to prevent coolant liquid from adhering to the surface of the glass fiber.

The flow surface may assume the form of a truncated, inverted funnel having either straight or curved sides in longitudinal cross section, or it may assume the form of a longitudinally slit tube which curves away from the vertically running glass fiber as the latter exits from the container.

The diversion of the liquid from the fiber is facilitated by maintaining a vapor barrier around the fiber to prevent the fiber from being wetted by the liquid. Therefore, the fiber is preferably not cooled by the liquid cooler to a temperature below the critical temperature that is required to support the vapor barrier.

The method and apparatus of this invention can be used in conjunction with conventional gas cooling apparatus to further cool the fiber prior to the application of a protective coating.

DETAILED DESCRIPTION OF THE INVENTION

Figure 1:
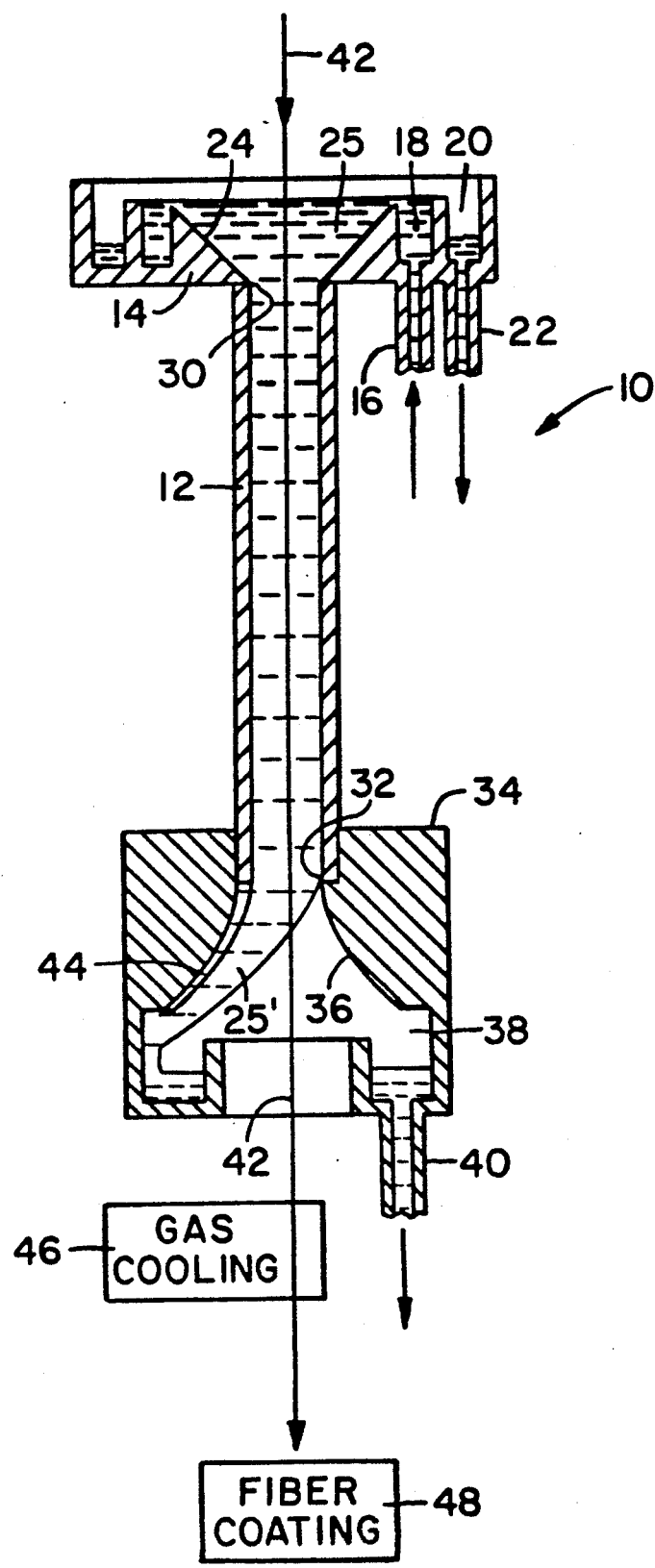
FIG. 1 is a partially schematic, longitudinal cross section of the apparatus of this invention and also illustrates the method.

Referring now to FIG. 1 of the drawings, the numeral 10 denotes generally the apparatus of this invention and includes a vertically extending container or tube 12 having an upper flange 14 which may be integral or nonintegral with the container. Flange 14 is provided with a fluid inlet line 16 terminating in an annular channel 18, with a second and radially outermost channel 20 communicating with conduit 22. 24 denotes a flared conical wall portion of flange 14, the lower portion of which terminates in upper opening 30 of container 12. The numeral 32 denotes an opening at the lower portion of container 12. A second flange 34, also integral or nonintegral, is provided at the lower end of container 12, flange 34 having an annular flow surface 36 in the general form of an inverted funnel. A generally vertically extending slot 44 on surface 36 extends from opening 32 to the lower part of surface 36. The structure is workable for limited angles formed between annular surface 36 and the axis of tube or container 12. At large angles, the fluid stream no longer attaches to surface 36. Because surface 36 is axis symmetric (without slot 44), fluid emerging from tube 12 would often be unstable in its location and might fluctuate from one position to another around surface 36. If this oscillation becomes too rapid, the liquid stream will release from surface 36 and become entrained along fiber 42. The presence of slot 44 overcomes this instability and confines the fluid to one region of surface 36, thereby stabilizing and confining the flow of fluid along the slot. The lower portion of surface 36 communicates with annular chamber 38 which functions as a liquid collection chamber. Pipe or tube 40 serves as a drain for chamber 38.

A vertically running glass fiber is schematically denoted as 42, with 42 being coincident with an imaginary vertical axis of the fiber.

A gas cooling chamber 46 is schematically shown and may assume any conventional form of such devices for cooling a hot glass fiber. A fiber coating apparatus 48 is also schematically indicated, with any conventional device of this type being suitable. It will be understood that the details of the gas cooling device 46 and the fiber coating device 48 form no part of this invention.

The operation of the apparatus/method shown at FIG. 1 is as follows. A hot glass fiber 42, as may be drawn from a glass furnace, is passed vertically through openings 30 and 32 of container 12. It will be observed that there are no obstructions between openings 30 and 32 along the vertical axis. Liquid coolant 25 then is fed into the upper portion of the apparatus through conduit 16 and into first annular channel 18 from which it overflows into the region of conical wall 24. Excess liquid spills into outer annular chamber 20 for discharge through conduit 22. In this embodiment, the vertical extent of liquid 25 between the point which fiber 42 enters the coolant liquid and lower opening 32 remains constant. Liquid 25 constantly flows downwardly through container 12 and onto flow surface this surface stream of liquid being denoted as 25'. Liquid 25' collects in chamber 38 for discharge from conduit 40.

Glass fibers are drawn at temperatures as high as 2000° C. The fiber temperature may be about 1700° C. at the time it enters the liquid coolant. A vapor barrier or jacket therefore forms about the fiber as it begins to traverse liquid 25. The vapor barrier preferably remains around the fiber during its entire traverse through the liquid, since its presence enhances the diversion of the liquid toward slanted flow surface 36. If the fiber were wetted by the liquid, a greater liquid diverting force would be required. The length of the liquid column is therefore preferably sufficiently short that the fiber temperature is always sufficiently high to maintain the vapor barrier. The column length is preferably long enough to cool the fiber to about that minimum temperature required to maintain the vapor barrier; that temperature is referred to herein as the critical temperature. Another factor that determines the column length is the temperature of the fiber as it enters the liquid, which in turn depends on the draw temperature, the draw speed, and the distance between the fiber draw furnace and the liquid cooler column.

There are additional reasons for maintaining the vapor barrier about the fiber along its entire traverse through liquid 25, if a liquid such as water is employed. Any water entrained on the fiber as it entered the coater would be detrimental to urethane acrylate coating materials. Another liquid such as alcohol might contact and wet the fiber prior to the emergence of the fiber from the liquid; any such alcohol remaining on the fiber could evaporate prior to the time that the fiber reaches the coater. Some other liquid might not adversely affect the coating material.

Another consideration is the degree to which the fiber is thermally shocked when contacted by the liquid. The critical temperatures for three liquid coolants are listed in the following table.

| Liquid Coolant | Critical Temperature |
| --- | --- |
| Water | 600° C. |
| Isopropanol | 500° C. |
| Refrigerant 113 | 250° C. |

To maintain a vapor barrier and thereby prevent the liquid from contacting the fiber, the minimum heat flux emitted by the glass fiber must be greater than the minimum heat flux required to sustain steady film boiling of the liquid coolant.

Water is a desirable coolant because of its low cost. To prevent water from contacting the fiber, the fiber temperature must be at least 600° C. If water contacts the fiber, the fiber temperature will immediately drop from about 600° C. to below 100° C., the boiling point of water. The resultant thermal shock is sufficient to cause fiber breakage. Therefore, the temperature of the fiber as it exits the water is preferably somewhat above 600° C. To further cool the fiber, so that it does not detrimentally affect the coating material, it is passed through gas cooling apparatus 46. When the fiber enters the coater, it is preferred that the maximum fiber temperature be about the same as the coating material temperature. A UV curable urethane acrylate coating material can be supplied to the fiber at 60° C.

It can be seen from the table that Refrigerant 113, also known a 1, 1, 2 trichloro 1, 2, 2 trifluoro ethane, would subject the fiber to much less shock if it were to contact the fiber. A fiber cooler employing such a coolant would probably not require an additional gas cooler, depending on factors such as the particular coating material employed.

Figure 2:
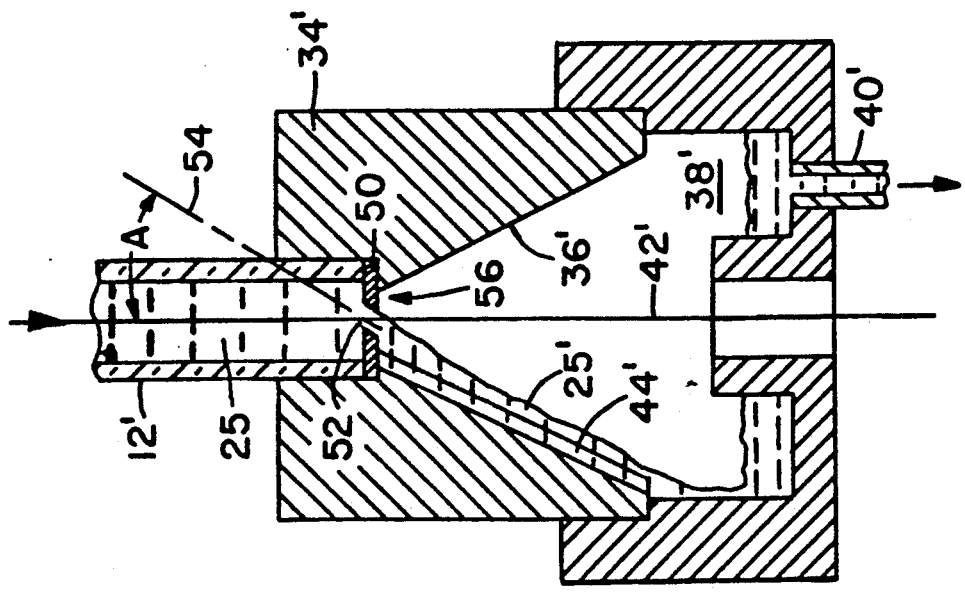
FIG. 2 is a partial longitudinal cross sectional view similar to FIG. 1, and illustrates a modification.

Referring now to FIG. 2 of the drawings, a modification is illustrated wherein corresponding elements (of the lower portion of the apparatus) are denoted by a prime. The significant difference between the construction of FIG. 1 and FIG. 2 is that in the latter the lower end of container 12' carries a plate 50. The plate is provided with a centrally disposed passage 52, the latter having a longitudinal axis 54. It will be observed that axis 54 makes an acute angle A with vertical axis 42, the latter being coincident with the hot glass fiber. Passage 52 is, in this embodiment, the container lower opening. An annularly continuous surface 36', again in the general form of a truncated, inverted funnel or cone, meets the lower portion of plate 50 at region 56. It will be observed that there can be a radial spacing between the uppermost portion of wall 36' at 56, and the lowermost periphery of passage 52. Passage 52 provides liquid 25' with a momentum that changes the direction of the liquid from the axis of fiber 42 toward slot 44' in surface 36'. The liquid flows as a stabilized stream 25' along and within slot 44'.

In one example of the modification of FIG. 2, container 12' was a transparent tube about 6 inches long and whose internal diameter was ½ inch. Plate 50 was ⅜ inch thick and passage 52 of a diameter of 0.177 inches. The angle A between passage axis 54 and fiber axis 42' was 30 degrees. The cross sectional dimensions of slot 44' were ⅛ inch wide by 1/16 inch deep. The use of plate 50 permits dripless starting and stopping, modest flow rates to maintain desired liquid column length and minimum distance between the edge of passage 52 to the glass fiber 42' of about 0.08 inches. Fiber velocity was about 7.1 meters per second.

Figure 4:
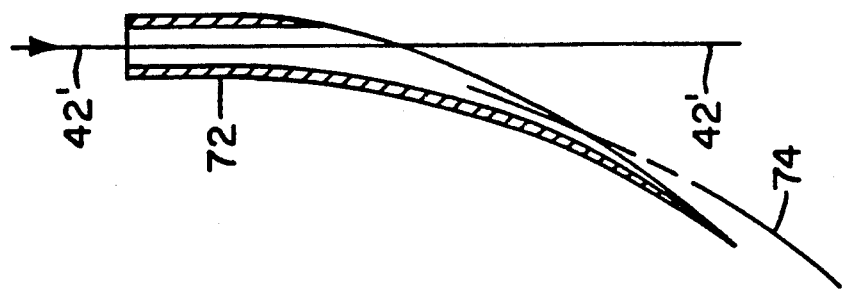
FIG. 4 is a perspective view illustrating a portion of the apparatus of FIG. 3.
Figure 3:
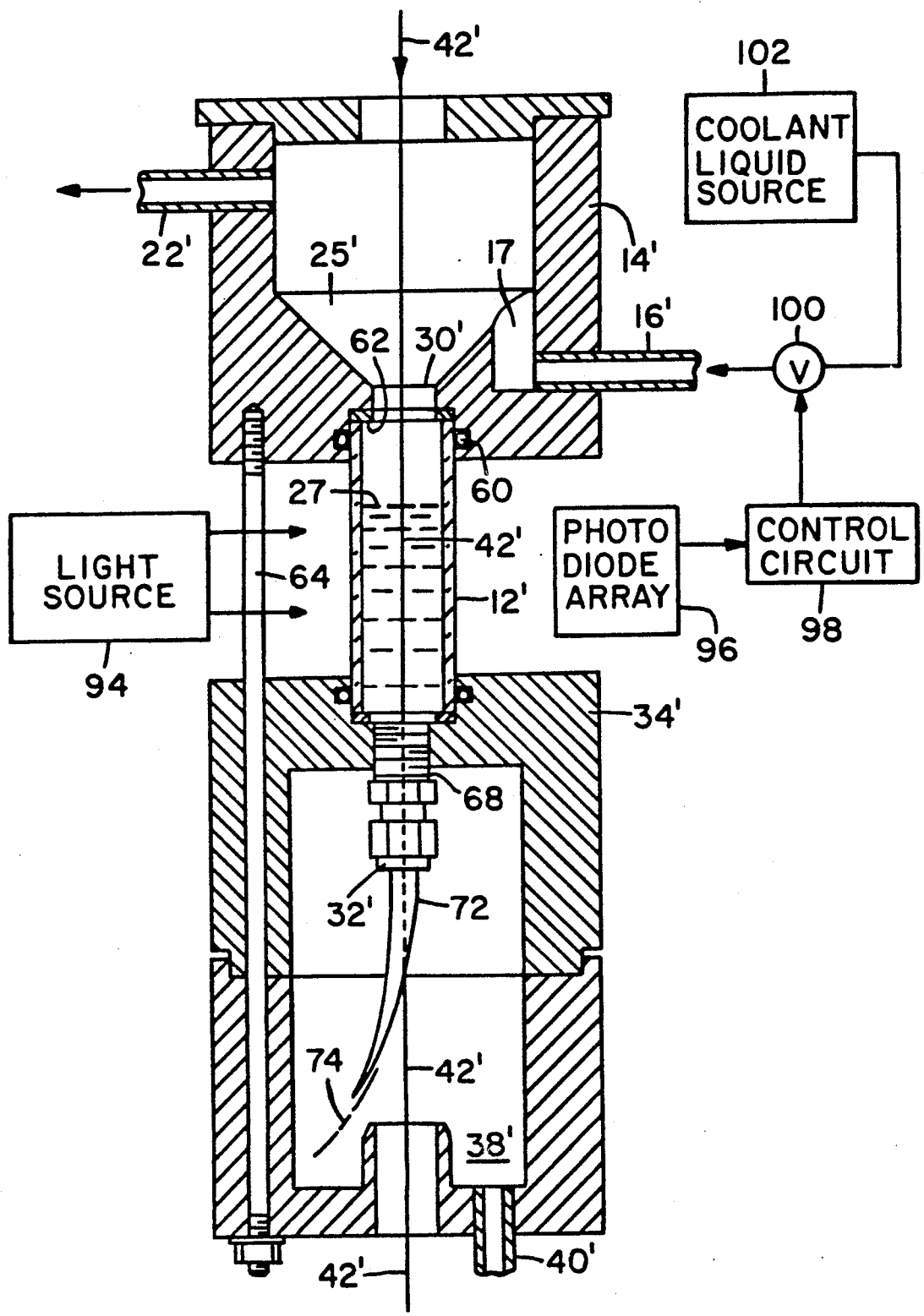
FIG. 3 is a longitudinal cross section of another embodiment of the invention.

Referring now to FIG. 3 of the drawings, those elements which are common to the embodiment of FIG. 1 are again denoted by a prime, while those elements which are not common bear different reference numerals. Auxiliary passage 17 feeds from 16' to 25'. A vertically extending transparent container or tube 12' is provided at its upper portion with a cushion 62, the latter positioned around the lower portion of container upper opening 30'. An 0-ring 60 is provided around the exterior surface of the upper end of tube 12'. A similar cushion and 0-ring are located at the bottom end of tube 12'. Tube 12' functions in the same manner as container 12 of FIG. 1. Any one of a plurality of angularly displaced threaded rods 64 may be employed to space upper flange member 14' from lower flange member 34'. A male connector 68 is threaded into an upper portion of member 34', with its lower portion 32' corresponding to lower container opening 32 of FIG. 1. A longitudinally slit tube 72 is curved, and has a longitudinal and curved axis 74 as also seen at FIG. 4. The uppermost portion of tube 72 is clamped by connector 68, with the action being such that liquid coolant flows from the upper portion of the apparatus through tube 12', through connector 68 and out of lower container opening 32' within connector 68. At this point surface tension causes the liquid to adhere to the concave, interior surface of tube 72 and, because the latter is bent away from the vertical axis of the apparatus (coincident with glass fiber 42') liquid coolant enters collecting chamber 38' for discharge through conduit 40'. Typical dimensions of the elements shown at FIG. 3 are as follows. Tube 72 has an inside diameter of 0.17 inch, and its tangent angle at the bottom end thereof is between about 40 to 45 degrees from the axis of fiber 42'. Tube 72 extended downwardly about 2 inches from connection 68. Various lengths between 3 inches to 12 inches were employed for tube 12'; its inside diameter was 0.75 inch, and its outside diameter was 1 inch. The longer length was preferred since it permits a greater range of liquid path lengths.

The use of a transparent tube 12' in FIG. 3 permits the height of the liquid level in tube 12' to be regulated. The liquid level can be observed visually or it can be measured by optical systems such as liquid level sensors and photodiode arrays. The flow rate of liquid into port 16' can be regulated to maintain the liquid level at a predetermined height 27 depending upon the requirements of the system. The requirements may vary with the type of liquid employed and the rate at which the fiber is drawn, which in turn determines the temperature of the fiber as it enters the liquid. If the height 27 of the liquid were initially maintained at a specific level for an initial draw rate, the liquid level height may be increased if the draw rate is increased. A system for automatic regulation is schematically shown and includes a light source 94, a photodiode array 96, a control circuit 98, a valve 100, and a coolant liquid source 102 governed by the valve. These elements for automatic control are of conventional construction and arrangement and hence need not be described in detail. Liquid level 27 may be measured continuously or intermittantly.

Figure 5:
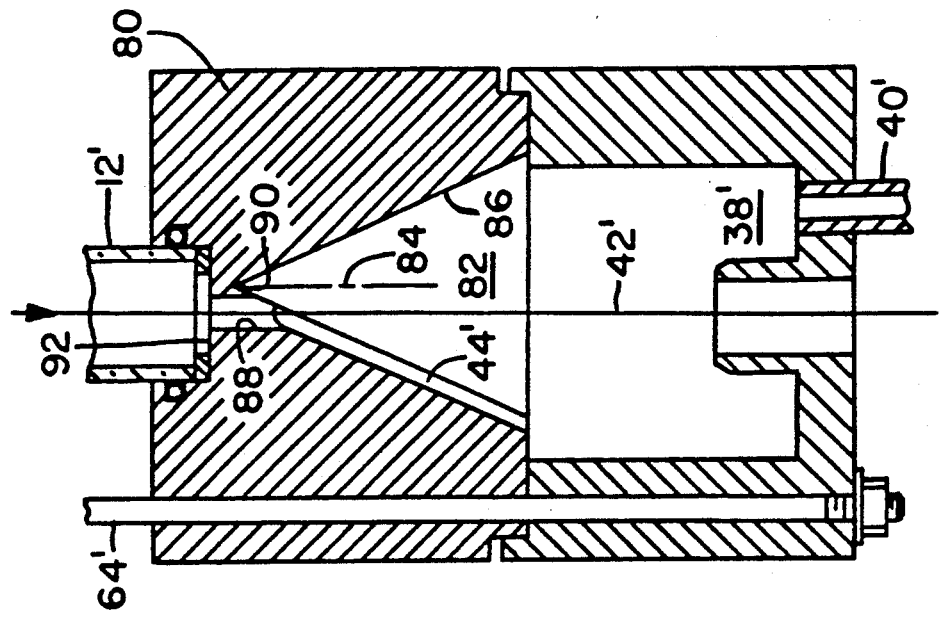
FIG. 5 is a longitudinal cross section of yet another embodiment of the invention.

A further embodiment is illustrated in FIG. 5 wherein elements similar to those in FIGS. 1 and 3 are represented by primed reference numerals. That portion of the apparatus above tube 12' is not shown since it is identical to that of FIG. 3. Lower flange member 80 is provided with a conical cavity 82, the axis 84 of which is offset with respect to fiber 42'. Cavity 82 is defined by annular flow surface 86. Cylindrical passage 88 is formed axially within member 80 such that it intersects surface 86 below apex 90 of conical cavity 82. Slot 44' is formed along that portion of surface 86 that is intersected by opening 88.

In a specific embodiment, surface 86 made a 20 degree angle with respect to cone axis 84. The height of conical cavity 82 was 3.0 inches. The overall height of member 80 was 3.75 inches, and the tube receiving shoulder 92 was 9/16 inch below the upper surface of member 80. The diameter of passage 88 was 0.125 inch and the axis of passage 88 was displaced from axis 84 by 0.250 inch. The cross sectional dimensions of slot 44, were ⅛ inch wide by 1/16 inch deep.

During the operation of the cooler of FIG. 5, fluid flows through tube 12' and passage 88 where it contacts slot 44'. Surface tension causes the fluid to adhere to surface 86, and the off-center location of passage 88 with respect to surface 86 tends to confine the fluid to that side of surface 86. The presence of slot 44' further stabilizes the flow of fluid in a vertical path down surface 86.

In the method and apparatus described, the glass fiber travels downwardly. Within the scope of the invention, however, the fiber may enter the coolant bath from below and exit from the container upper opening. Further, flow surfaces 36, 36', and 86 are shown as curved and of annular form. These surfaces could be flat, such as a single flat wall, and need not be of 360 degrees angular extent (FIGS. 1, 2 and 5) or even of 180 degrees angular extent (FIG. 3). Similarly, the upper and lower container openings can be rectangular, as well as circular.

What is claimed is:

1. An apparatus for the non-abrasive liquid cooling of a vertical, continuously running hot glass optical fiber of indefinite length, the apparatus including a container having an opening at its upper end and at its lower end, a vertical axis passing though said upper and lower openings and said container, the container being unobstructed along said axis between said upper and lower openings, means for supplying liquid coolant to said container, said coolant flowing in a stream downwardly through said container, and flow diverting means at the bottom of said container for diverting said stream at an angle from the vertical, said flow diverting means being situated in a non-contact relationship with respect to an optical fiber extending along the vertical axis of said container.

2. An apparatus for liquid cooling of a vertical, continuously running hot glass fiber of indefinite length, the apparatus including a container having an opening at its upper end and at its lower end, a vertical axis passing though said upper and lower openings and said container, the container being unobstructed along said axis between said upper and lower openings, means for supplying liquid coolant to said container, said coolant flowing in a stream downwardly through said container, and means at the bottom of said container for diverting said stream at an angle from the vertical, said means including a flow surface extending from a region in the vicinity of said lower opening and extending downwardly therefrom and slanting away from said vertical axis.

3. The apparatus of claim 2 wherein said flow surface is curved.

4. The apparatus of claim 2 wherein the uppermost portion of said flow surface merges smoothly with the lower portion of said container at said lower container opening.

5. The apparatus of claim 2 wherein said flow surface is in the general form of an inverted conical funnel, the lowermost portion of which is provided with means to collect liquid.

6. The apparatus of claim 2 wherein the lower end of said container is provided with a plate having a passage therethrough, said passage having a longitudinal axis, said plate passage defining said container lower opening, said vertical axis passing through said passage, said passage longitudinal axis intersecting said vertical axis at an acute angle, the uppermost portion of said flow surface meeting said plate in the vicinity of said plate passage.

7. The apparatus of claim 2, wherein said flow surface is a portion of a longitudinally slit tube, the tube having a longitudinal axis which is coincident with and then bends away from said container vertical axis.

8. The apparatus of claim 2, wherein said flow surface contains a slot whose upper end is in the vicinity of said lower container opening.

9. The apparatus of claim 8 wherein a vertically disposed passage extends from the upper end of said slot to said container.

10. A non-abrasive method of cooling a hot, vertically running glass optical fiber, the method including the steps of, continuously passing a vertically disposed hot glass fiber of indefinite length through a container having a vertically disposed column of a coolant liquid therein, the liquid having a lower temperature than that of the glass fiber, the liquid column being open at both its top and its bottom ends, and continuously draining liquid from the container bottom end by causing the liquid to drain downwardly and laterally therefrom, in a direction away from the vertically running glass fiber without contacting the fiber with any structure.

11. A method of cooling a hot, vertically running glass fiber, the method including the steps of, continuously passing a vertically disposed hot glass fiber of indefinite length through a container having a vertically disposed column of a coolant liquid therein, the liquid having a lower temperature than that of the glass fiber, the liquid column being open at both its top and its bottom ends, and continuously draining liquid from the container bottom end by causing the liquid to drain downwardly and laterally therefrom, in a direction away from the vertically running glass fiber, the temperature of the hot glass fiber relative to that of the coolant liquid being such that a vapor barrier due to boiling of the liquid surrounds the hot fiber throughout its immersed length in the liquid to thereby facilitate lateral changing the direction of flow of the liquid coolant as the liquid exits from the container end.

12. The method of claim 11 including the step of maintaining the height of said column at a level such that the temperature of the fiber decreases to about the lowest temperature capable of maintaining the vapor barrier at the time the fiber exits from the coolant liquid.

* * * * *